United States Patent [19]

Tait

[11] 4,082,307
[45] Apr. 4, 1978

[54] MOTORCYCLE SUSPENSION

[76] Inventor: Robert John Tait, 15 Manor Farm Rd., Tredington, England

[21] Appl. No.: 638,328

[22] Filed: Dec. 8, 1975

[51] Int. Cl.² .................................. B62K 25/06
[52] U.S. Cl. .................................. 280/277; 280/279
[58] Field of Search ............ 280/279, 270, 276, 277, 280/263, 661, 96.3, 92; 180/29, 30, 31

[56] References Cited

U.S. PATENT DOCUMENTS

| 404,832 | 6/1889 | Goulden | 280/276 |
| 1,089,647 | 3/1914 | Johnston | 280/270 |
| 1,184,321 | 5/1916 | Chapin | 280/270 |
| 1,188,168 | 6/1916 | Genovese | 280/276 |
| 1,227,634 | 5/1917 | Lake | 280/276 |
| 1,535,435 | 4/1925 | Neracher | 280/276 |
| 2,233,313 | 2/1941 | Hazelroth | 280/276 |
| 2,768,836 | 10/1956 | Hilber | 280/279 |
| 3,521,904 | 7/1970 | Sheffer | 280/279 |
| 3,655,219 | 4/1972 | Jacoby | 280/279 |
| 3,866,946 | 2/1975 | Robison | 280/279 |

FOREIGN PATENT DOCUMENTS

| 444,888 | 5/1927 | Germany | 280/270 |
| 889,870 | 7/1953 | Germany | 280/279 |
| 523,424 | 4/1955 | Italy | 280/279 |
| 570,439 | 7/1945 | United Kingdom | 280/279 |
| 4,994 of | 1885 | United Kingdom | 280/270 |
| 90 of | 1915 | United Kingdom | 280/279 |

Primary Examiner—Kenneth H. Betts
Attorney, Agent, or Firm—Young & Thompson

[57] ABSTRACT

A motorcycle includes a steered wheel assembly wherein the steered wheel is mounted on a hub member which is rigidly secured to one end of a telescopically sprung fork assembly the other end of which is pivoted to the frame. A radius arm assembly is also pivoted to the frame and to the hub member. The pivotal connection between the fork assembly and the frame is adjustable to alternative frame-fixed positions to vary the steering characteristics of the motorcycle.

6 Claims, 9 Drawing Figures

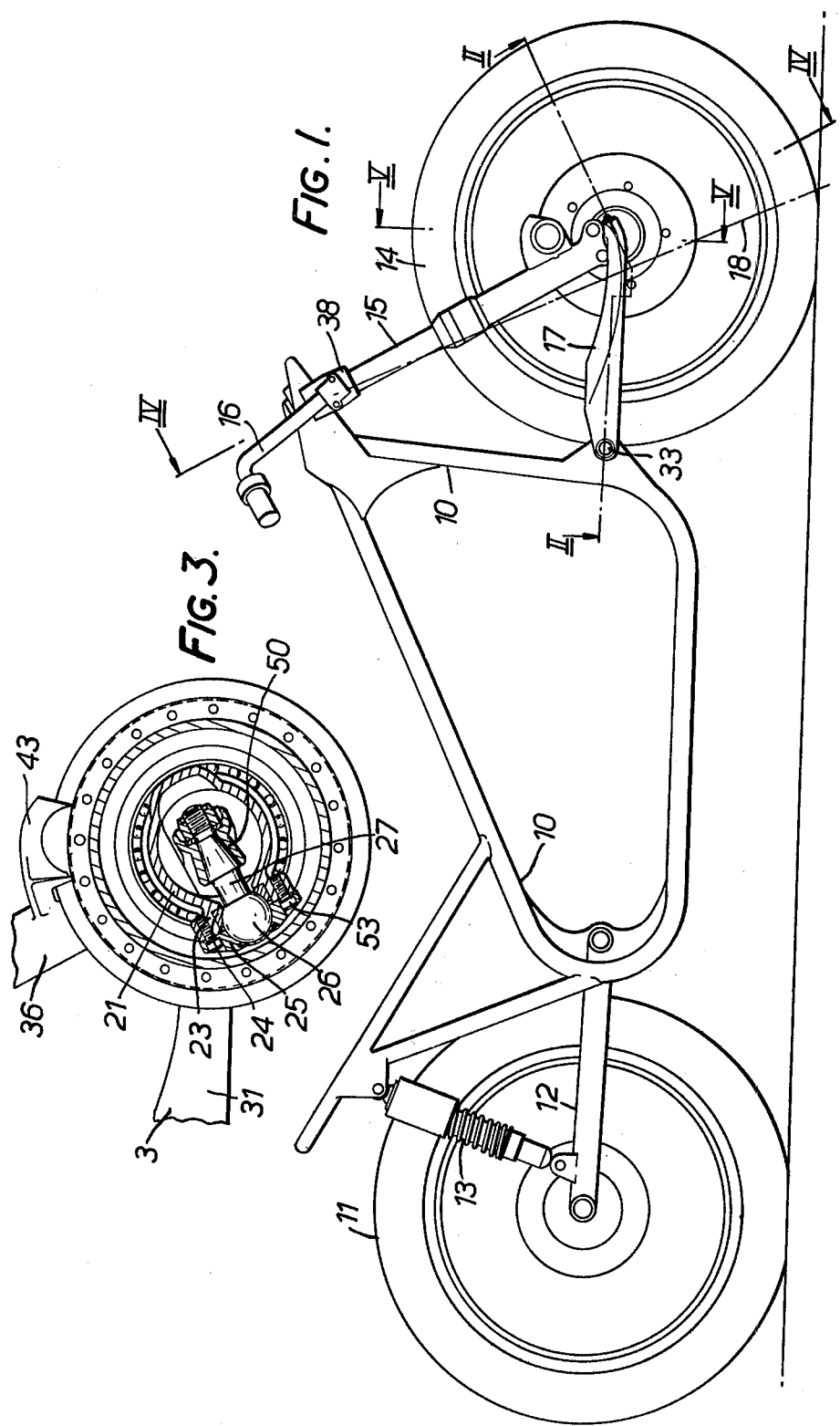

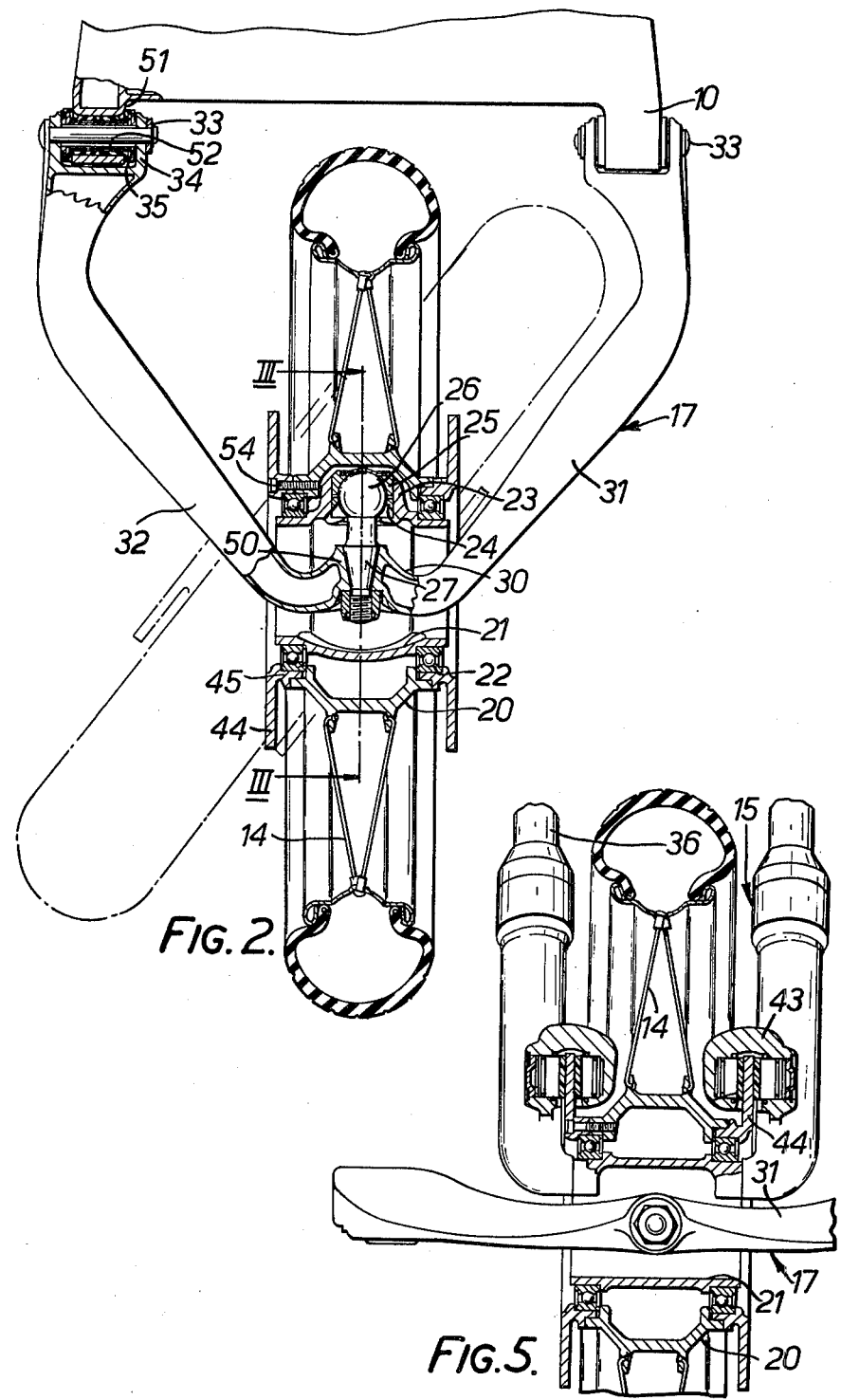

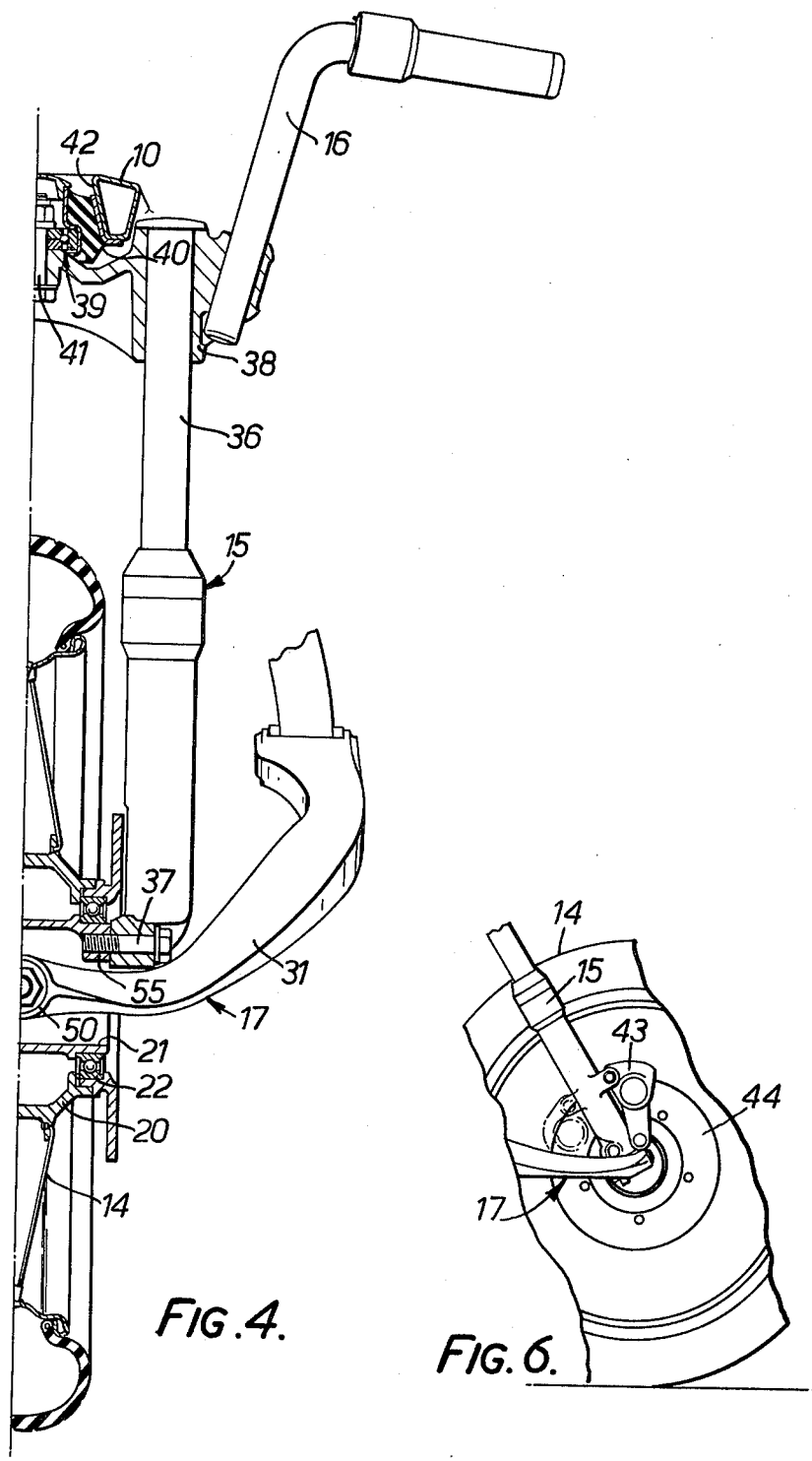

MOTORCYCLE SUSPENSION

FIELD OF THE INVENTION

This invention realtes to frame and axle assemblies for motorcycles, including bicycles, tricycles and scooters, that is, motor-driven vehicles having a single steered wheel.

BACKGROUND OF THE INVENTION

Good high-speed steering characteristics and stability can be obtained in a motorcycle with front-wheel spring suspension by adopting hub steering, the wheel being pivoted for steering by means of a ball or gimbal joint inside an inner hub member on which the wheel hub rotates and at the ends of a pair of radius arms pivoted to the motorcycle frame. The steering axis passes through the wheel axis and is raked, for example at an angle of 12°, to obtain a suitable self-centring or castor effect. A steering fork fixed at its ends to the inner hub member may extend to a bearing above the wheel, which bearing is also carried on radius arms or on a cantilever spring. In such arrangements the steering axis is forward of the handlebar turning axis and a coupling linkage is necessary. Furthermore the assembly having the steering axis passing through the wheel axis does not have the advantage of steering columns and forks in which the steering axis commonly passed behind the wheel axis and may have a rake or castor angle of the order of 25°.

SUMMARY OF THE INVENTION

A frame and axle assembly for the steered wheel of a motorcycle has a wheel hub inner member carried on an internal pivot and rigidly secured to a raked fork or side arm assembly extending to a frame-fixed overhead bearing.

BRIEF DESCRIPTION OF THE DRAWINGS

FIG. 1 is a side view of a motorcycle incorporating the improved frame and axle assembly, FIG. 2 is a part-sectional view on the line II—II of FIG. 1, FIG. 3 is a sectional view on the line III—III of FIG. 2, FIG. 4 is a front view, partly in section, on the line IV—IV of FIG. 1, FIG. 5 is a part-sectional view on the line V—V of FIG. 1, FIG. 6 is a side view of the mounted steered wheel illustrating alternative brake caliper dispositions.

DESCRIPTION OF THE PREFERRED EMBODIMENTS

Figure 7:
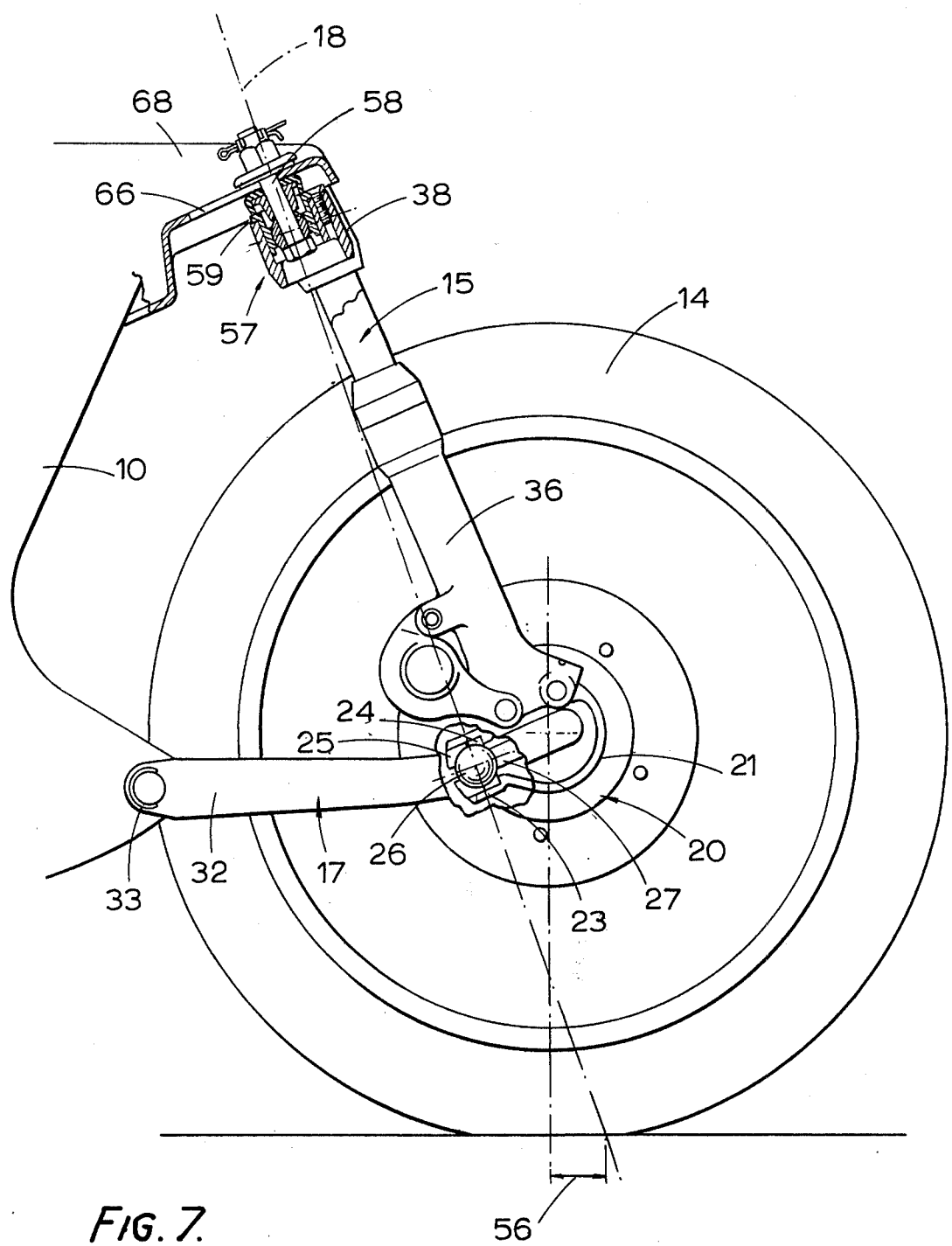
FIG. 7 is a side view, partly in section, of the front suspension of a motorcycle embodying means for adjusting castor trail.

As shown in FIG. 1, the motorcycle comprises a main frame 10, a rear wheel 11 carried on rearwardly extending radius arms 12 and telescopic struts 13, and a front steered-wheel assembly comprising a wheel 14, steering fork 15, handlebars 16 and a structure 17 of wish-bone shape serving as a swinging arm assembly to which the wheel is pivoted within the wheel hub bearing.

The steered-wheel assembly will now be described with particular reference to FIGS. 2 to 5. For the wheel 14, a hub 20 of adequate diameter for hub steering is mounted in a conventional manner upon an inner generally-cylindrical hub member 21 fitted with a ball bearing 22 adjacent each of its ends. The hub member 21 has an open boss or circular walled protuberance 23 outwardly extending between the bearings 22 and accommodated with clearance within the hub 20, which boss 23 houses a pair of opposed cups 24 and 25 providing a socket for a pivot ball 26.

The pivot ball 26 is formed as the head of a tapered and end-threaded stud 27 held firmly at the crook 30 of the wish-bone structure 17. The latter passes through the hub member 21 with symmetrical arms 31 and 32 diverging from the hub for steered wheel clearance and extending in use approximately horizontally and rearwardly to spaced pivot pins 33 fixed to the cycle frame 10 so that the wish-bone structure 17 functions as a radius arm assembly swinging about a fixed transverse horizontal frame axis. For the pivots, the pins 33 pass through forked ends 34 of the wish-bone structure 17 and through packing sleeves 35 in bores of frame-fixed pivot brackets 51. The ball-headed stud 27 extends symmetrically between the arms 31 and 32 and is inclined slightly downwardly from the plane of the arms to provide a pivot for steering movement of the hub member 21 about an axis 18 (FIG. 1) off-set from and behind the hub axis as more fully identified hereinafter.

Steering movement of the hub member 21 and wheel 14 is effected and controlled by means of the spring fork structure 15 which also controls vertical movement of the hub and wheel. The fork structure 15 comprises a pair of telescopic legs 36 (FIG. 4), one on each side of the wheel, bolted at their lower ends by pairs of screws 37 to the hub member 21. The legs 36 are parallel and fixed at their upper ends in a transverse yoke 38 which also provides mountings for the handlebars 16. The yoke 38 has a central thrust bearing 39 comprising a ball bearing within an annular rubber mounting 40 which has a coned seating 42 in the frame 10, the inner race of the ball bearing being bolted by a bolt 41 to the yoke 38 for rotation about the steering axis 18 (FIG. 1) which passes through the ball pivot 26 within the hub member 21.

The cycle frame 10 is shaped as shown in FIG. 1 so that the bearing 39 in the yoke 38 is overhead and slightly forward of the pivot pins 33 for the wish-bone structure 17 and so that the steering axis 18 has a rake or castor angle of the order of 25° and passes behind the hub axis to intersect the vertical through the hub axis about half way from the ground to the hub axis.

A caliper 43 (FIG. 6) for a disc brake is mounted on the lower part of each of the telescopic legs of the steering fork 15, either in front of the leg as shown in full lines or behind the leg as shown in dashed lines. Each caliper is operable to press friction pads upon opposite sides of a radial brake disc 44 with an inner ring flange 45 (FIG. 2) forming part of the hub 20.

Further detailed features of the preferred construction will now be referred to. The wish-bone structure 17 is formed with a central boss 50 having a tapered bore to receive the ball-headed stud 27. Each pivot bracket 51 is fitted with a flanged sleeve 52 within the packing sleeve 35 which latter is of rubber or plastics material to provide for axial and radial shock absorption and also seal the bearing surfaces from contamination.

The ball-headed stud 27 before attachment to the wish-bone structure 17 is inserted through the hub member 21 and the inner cup 24, the latter providing a hemispherical half socket. The stud is then secured in the hub member 21 by applying the outer cup 25 and securing that cup to the hub member 21 by means of two headed screws 53 (FIG. 3).

The hub member 21 is, as shown particularly in FIG. 2, a tubular body with reduced-diameter end portions over which the ball bearings 22 are fitted to abut steps or shoulders for their axial location. The hub 20 comprises a body portion between the brake discs 44, the inturned ring flanges 45 of the latter being stepped to provide seatings on the outside for receiving and registering with the body portion and seatings on the inside for receiving and axially locating the associated ball bearings 22. The flanged brake discs 44 may be fastened to the body portion by screws 54.

The hub member 21 further has at each end an inward extension 55 (FIG. 4) to which the lower end of the corresponding telescopic fork leg 36 is rigidly secured by the pair of screws 37. The housing for brake pistons and pads comprising the caliper 43 for the disc brake at each side of the wheel may be formed integrally with the lower end of the telescopic fork leg as shown in FIG. 1, or may be bolted to a lug on the front or rear of the fork leg and also held by one of the leg-securing screws 37 as shown in FIG. 6.

The upper parts of the telescopic fork legs 36 are clamped by any suitable method into the yoke 38 (FIG. 4). The bearing 39 in the yoke 38 is a duplex type ball double-thrust bearing incorporating seals and is secured by the bolt 41 to the centre of the yoke 38. The outer race of this bearing is retained, for example by peening, in an inner steel sleeve of the coned annular rubber mounting 40, which latter is prestressed and provides for an axial deflection of 5/16 inch, to provide insulation against the transmission of road wheel vibration and shock to the frame. The coned outer steel member of the rubber mounting 40 has a pierced flange for screw attachment to the frame to retain the mounting in the coned aperture 42.

The handlerbars 16 are in separate halves separately mounted in the yoke 38 and adjustable in height and fore-and-aft position. In an alternative yoke construction, the yoke has a central integral spigot to pass through and locate the thrust bearings, the yoke being splined and grooved to receive a mounting bracket, clamped by a pinchbolt, for the handlebars.

The steering axis 18 through the ball pivot 26 in the hub bearing 21 passes through the effective centre of rotation of the thrust bearing 39 which, being rubber mounted, follows changes of angle or attitude of the fork assembly 15 when the wish-bone structure 17 is deflected by road-surface irregularities. Steering movements of the handlebars 16 are transmitted through the yoke 38 and telescopic legs 36 of the fork assembly 15 to turn the hub-bearing 21, and hence the wheel 14, on the pivot ball 26.

The arms 31 and 32 of the wish-bone 17, splayed to permit full lock of the wheel 14, curve inwardly to the pivot pins 33 to provide a reasonable radius arm length and to enable the pivot pins 33 to be tucked in behind the tyre of the wheel 14 at the full lock position.

Road irregularities are absorbed by the telescopic fork legs 36 with internal or external springs and internal fluid damping. Road-produced vibrations are isolated from the frame 10 by the rubber mounting in the yoke 38 and the rubber or plastics sleeves 35 in the pivot brackets 51. Further it will be seen that severe road impacts and the large stresses imposed by the double disc brake, as encountered at high speeds of medium-weight and heavy-weight bicycles, are dispersed to the frame through three widely spaced pivot mountings.

By the mounting of the handlebars 16 directly to the yoke 38 containing the steering axis 18, the forward part of the motorcycle is free from the encumbrances of a remote steering column, steering arms and interconnecting rod linkages. Hence room becomes available for the inclusion of a locker or cabinet compartment of ample size and/or for re-siting or enlargement of the fuel tank and facilitates the grouping and panel mounting of instruments and accessories.

Figure 8:
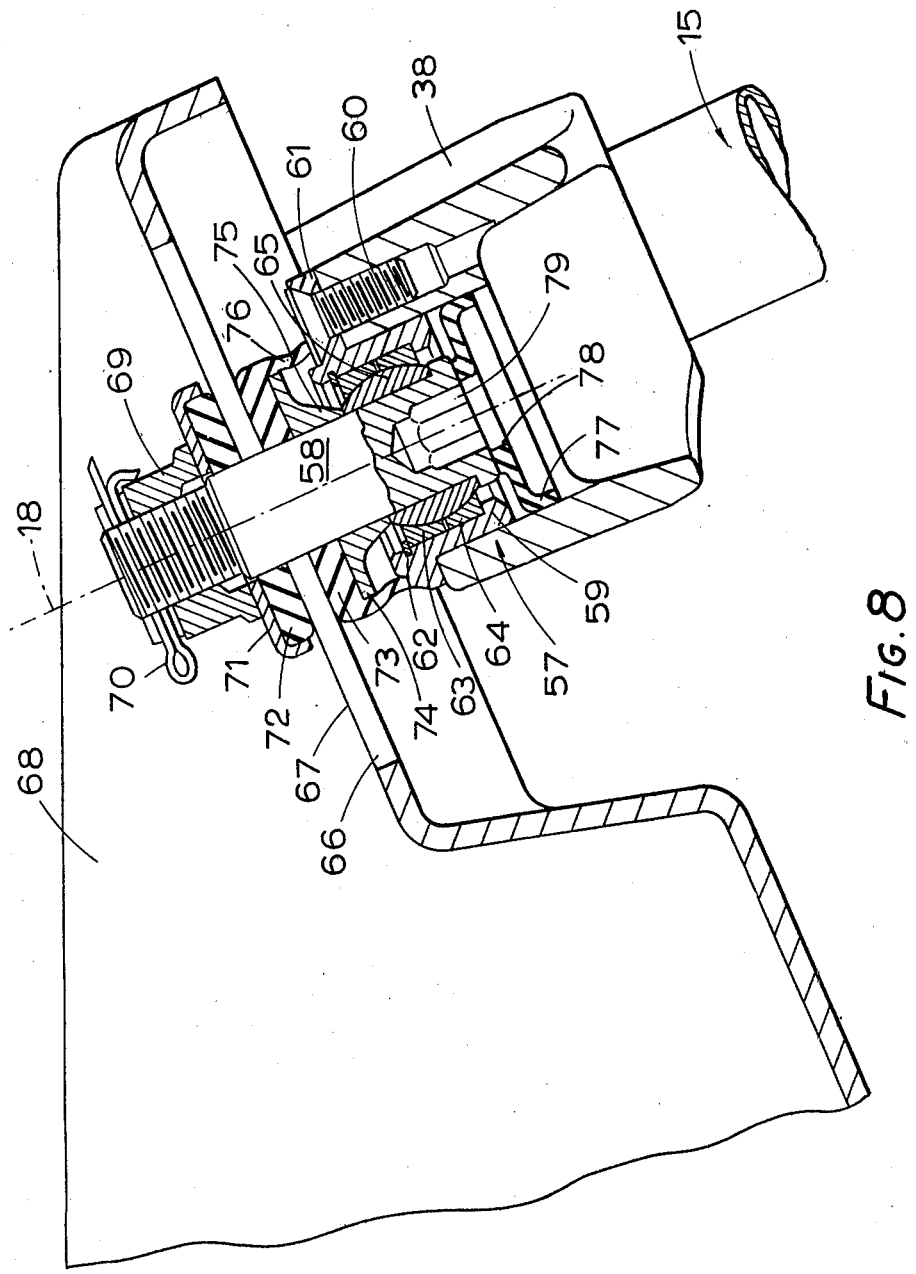
FIG. 8 is a side view, partly in section, of the means for adjusting castor trail.
Figure 9:
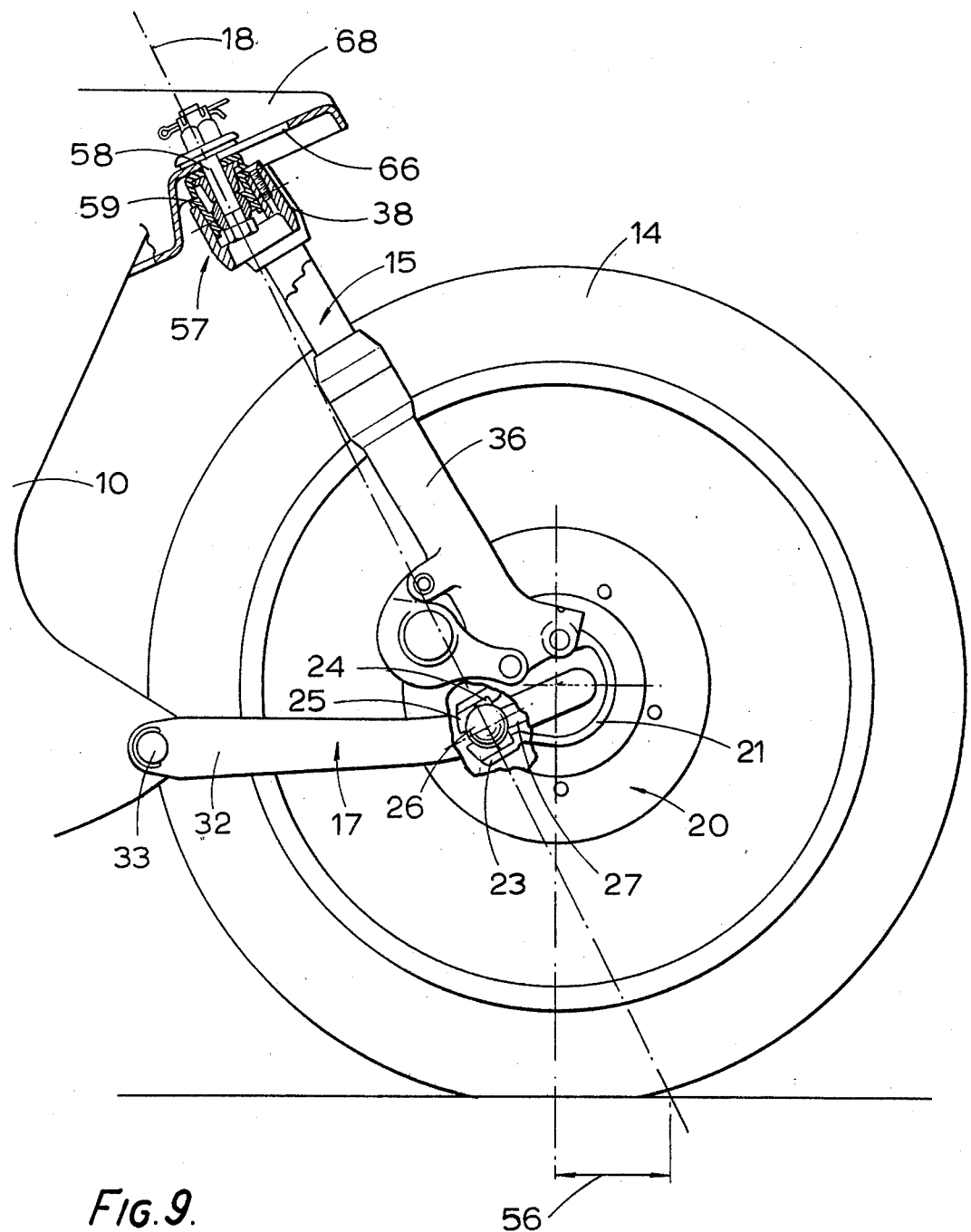
FIG. 9 is a view similar to FIG. 7 but with the means for adjusting castor trail set in a different position.

FIGS. 7 to 9 depict the second embodiment of the invention, in which means are provided for adjusting the rake or castor angle or the steering axis 18. This varies the degree of castor trail 56, which in turn varies the self-centring effect of the steering so that the steering characteristics can be set up for optimum performance under particular operating conditions. In this embodiment the steering fork, hub and swinging arm assembly are similar to those of the first embodiment, and have been given the same reference numerals.

To provide for adjustment of the castor trail 56, an overhead bearing 57 is provided which is adjustable to different positions with respect to the cycle frame 10 so that the rake and hence the castor trail 56 can be changed.

This is achieved by housing the overhead bearing 57 in or on the yoke 38 at the head of the telescopic fork structure 15 to flex and rotate about a protruding bolt 58 which can be tightened in any of a range or positions in the frame 10. The duplex bearing with a conical rubber mounting in the frame as described for the first embodiment is replaced by a part-spherical bearing in the yoke 38. This bearing comprises a flanged cylindrical housing 59 let into the upper face of the yoke 38 midway between the locations of the legs 36 of the fork 15 and secured by screws 60 passing through the flange 61 into said upper face. Retained in the housing 59 by a circlip 62 are split socket members 63 and 64 embracing a part-spherical surface of a ring 65 upon a headed through-bolt 58 projecting upwardly from the yoke 38. The through-bolt 58 passes through a fore-and-aft slot 66 in a flat-plate portion 67 of a nose extension 68 of the cycle frame 10, this portion 67 being inclined to lie approximately normal to the steering axis 18. A top-end nut 69 on the through-bolt 58 is tightened and secured by a split pin 70 to clamp the flat-plate frame portion 67 between packing washers which include an upper metal cup washer 71 embracing a rubber or elastomeric washer 72 above the frame portion 67 and, below the frame portion 67, a skirted elastomeric washer 73 and a metal backing washer 74 having a bush portion 75 tapering to abut the part-spherical ring 65. The bolt pressure is applied between the cup washer 71 and the backing washer 74, the elastomeric washers 72 and 73 separating the metal parts from metal-to-metal contact, and the skirt 76 serving to seal the spherical joint against the entry of dirt and water. A rubber or other elastomeric sealing annulus 77 is pressed from the under-side of the yoke 38 against the wall of the opening receiving the housing 59 and against the head of the bolt 58, leaving a passageway 78 for access to a hexagonal socket hole 79 in the bolt head. Grease or other lubricant is packed into the sealed joint.

The steering axis 18 passes through the centre of the spherical surface of the ring 65 and through the pivot ball 26 in the hub 20. The plane containing the fork leg axes is preferably arranged somewhat forward of the steering axis. When the through-bolt 58 of the head joint 57 is halfway along the slot 66, as shown in FIG. 8, a castor angle usually of 25° is set up for the motorcycle in its general-purpose role. A position at the forward end of the slot 66, as depicted in FIG. 7, reduces the angle typically by about 4° whilst a position at the rearward end increases the angle by the same amount, as shown in FIG. 9.

Such a range of adjustment, that is, ± 4°, is appropriate in the case of a motorcycle of average size to reach a minimum trail of about 1.8 inches for light steering at slow speeds, and a maximum trail for optimum stability at high speeds of about 3.7 inches. The total movement through 8° is typically provided by a slot length of 3 inches with a through-bolt diameter of 0.75 inch. The described head joint takes the working axial and radial thrust loads, and provides in a compact manner for rotation of the fork structure 15 for steering purposes and for angular movement of the fork structure as it changes telescopically in length to ride the road or track surface, as well as for setting for a desired trail.

As will be appreciated, when adjustment of the position of the head bearing 57 is being made, the fork structure 15, head bearing 57 and fixed hub member 21 swing together through an arc, the off-set ball socket 24, 25 in the hub member 21 pivoting on the ball 26 of the stud 27 located at the centre of the swinging arm 17. To avoid any variation in the stance of the motorcycle, the centre of the slot 66 in the nose 68 of the cycle frame 10 is preferably arranged to intersect to the steering axis 18.

I claim:

1. A suspension and steering assembly for the steered wheel of a motorcycle, comprising a raked telescopic fork assembly, a pivotal connection between one end of the fork assembly and a frame of the motorcycle permitting relative rotational movement between the fork assembly and the frame about an axis normal to the plane of the frame and about an axis contained in that plane, handlebars rigidly attached to the fork assembly, a non-rotary wheel hub member secured to the other end of the fork assembly, a wheel rotationally mounted on the wheel hub member, a radius arm assembly pivoted to the frame below the pivotal connection between the fork assembly and the frame, and pivotal connection between the radius arm assembly and the hub member at a location rearwardly spaced from the axis of rotation of the wheel, the pivotal connection between the fork assembly and the frame and the pivotal connection between the radius arm assembly and the hub member together defining a steering axis which passes through said pivotal connections and passes rearwardly of the axis of rotation of the wheel.

2. An assembly according to claim 1, wherein said pivotal connection between the fork assembly and the frame comprises a flexibly mounted thrust bearing.

3. An assembly according to claim 1, wherein said pivotal connections between the fork assembly and the frame and between the radius arm assembly and the hub member comprise ball and socket joints.

4. An assembly according to claim 1, wherein the pivotal connection between the fork assembly and the frame comprises a ball flexibly mounted on the frame by means of a pair of elastomeric washers, one clamped on either side of a frame portion by a through bolt, and a socket mounted on the fork assembly and cooperating with the ball, one of the elastomeric washers providing a seal for the connection.

5. An assembly according to claim 4, wherein the ball is adjustable to different frame-fixed positions to provide different rake angles.

6. An assembly according to claim 1, wherein the handlebars are formed in two parts separately attached one to each side of the fork assembly.

* * * * *